May 2, 1967  G. W. MERROW ET AL  3,316,635
SCORING KNIFE

Filed May 6, 1964  2 Sheets-Sheet 1

INVENTORS
GEORGE W. MERROW
ROBERT F. McKEE
ROBERT F. WEST
BY *Lindsey, Prutzman and Hayes*
ATTORNEYS May 2, 1967  G. W. MERROW ET AL  3,316,635
SCORING KNIFE Filed May 6, 1964  2 Sheets-Sheet 2

INVENTORS
GEORGE W. MERROW
ROBERT F. McKEE
ROBERT F. WEST
BY Lindsey, Prutzman and Hayes
ATTORNEYS

United States Patent Office 3,316,635
Patented May 2, 1967

3,316,635
SCORING KNIFE
George W. Merrow, Bloomfield, Robert F. McKee, Cheshire, and Robert F. West, Simsbury, Conn., assignors to The Stanley Works, New Britain, Conn., a corporation of Connecticut
Filed May 6, 1964, Ser. No. 365,424
8 Claims. (Cl. 30—162)

The present invention relates to scoring knives and more particularly to a new and improved knife handle of the replaceable blade type.

An object of the present invention is to provide a knife handle which facilitates the smooth and effortless mounting and replacement of the cutting blade without disassembly and utilizes the full extent of the knife handle for both storage and manipulation of the blade.

Another object of the present invention is to provide a knife handle which cooperates with an adjustable blade to break off the dull used sections thereof and additionally permits continuous use of the blade without the necessity of further adjusting the position thereof within the knife handle.

A further object of the present invention is to provide in a knife handle a storage compartment which utilizes a substantial portion of the handle length and at least partially overlaps the blade carriage of the handle.

A still further object of the present invention is the provision of a new and improved finger-tip-actuated closure which provides full accessibility to a compact storage compartment.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
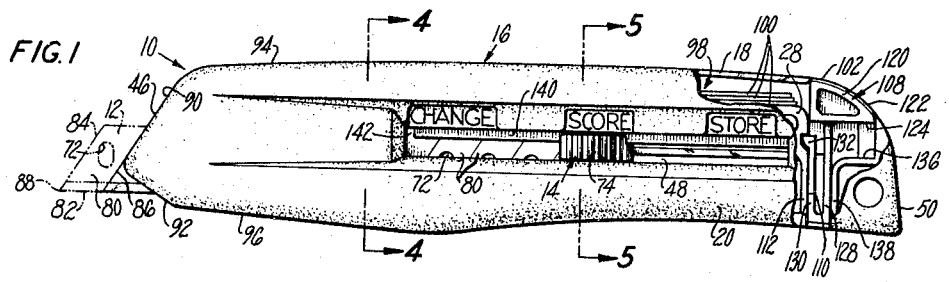
FIG. 1 is a side elevational view of the knife of the present invention, partially broken away and showing an adjustable blade mounted in a cutting position.

The scoring knife of the present invention incorporates several features which enhance and simplify its operation and utilization. These features, which individually make their own substantial contribution to the totality of the improved construction, include but are are not limited to the specific aspects of the knife illustrated in the drawing. For example, the longitudinal storage compartment which overlies the area of blade manipulation contributes to the compactness of the knife yet is readily accessible through the easily opened closure continuously retained within the knife handle. Additionally, the ease with which blades can be mounted and those features which permit substantially uninterrupted operation are particularly advantageous as set out hereinafter in greater detail.

Figure 2:
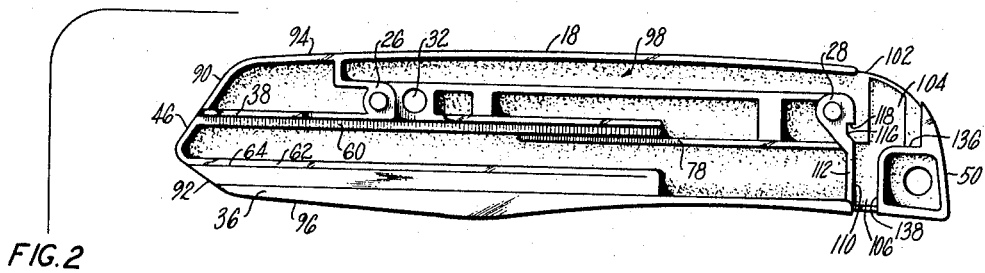
FIG. 2 is an exploded view of the knife handle showing the interior of the complementary side elements of the handle body.
Figure 2:
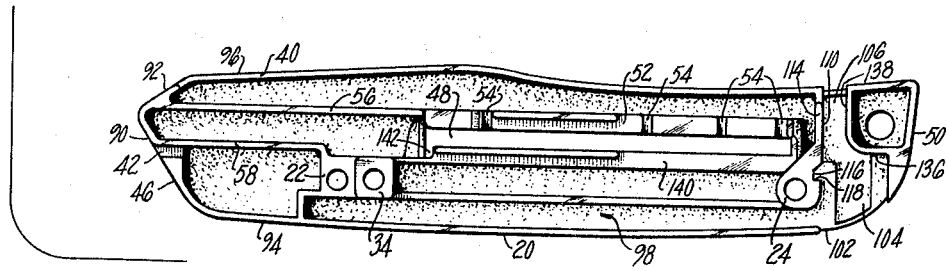
Figure 3:
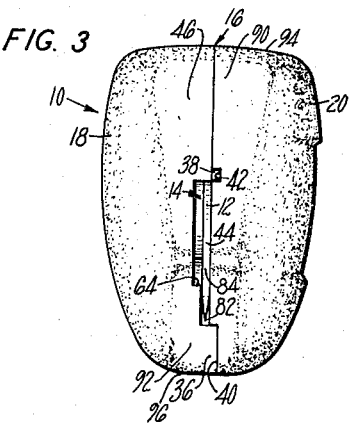
FIG. 3 is an enlarged front view of the knife handle shown in FIG. 1.

Referring now to the drawings in detail wherein like reference characters indicate like parts throughout the several figures, there is shown in FIG. 1 an adjustable scoring knife, generally designated 10, constructed in accordance with the present invention. The knife 10 includes a cutting blade 12 mounted on a blade carriage 14 for slideable movement longitudinally within the generally rectangular handle body 16. The body 16 is comprised of complementary handle side elements 18, 20 which may be die cast in the required configuration and possess suitable aligning and interlocking portions. As shown in FIG. 2, handle element 20 possesses socket-containing bosses 22, 24 for receiving cooperating aligning pins located on bosses 26, 28, respectively, in handle element 18 thereby maintaining the side elements 18, 20 in proper aligned assembly. The elements are maintained in this relationship by a retaining screw 30 which passes through countersunk hole 32 in element 18 and is threadably secured in boss 34 located adjacent socket-containing boss 22. Element 18 also possesses a flange 36 on the bottom periphery thereof and a medial longitudinal flange 38. The flanges 36, 38 are received in mating interlocking depressions 40, 42 on element 20 and provide not only a cooperation therebetween preventing misalignment but also guide rails for blade 12 which define a cavity extending rearwardly from a vertical central aperture 44 in the front face 46 of handle body 16 as best shown in FIG. 3.

Figure 4:
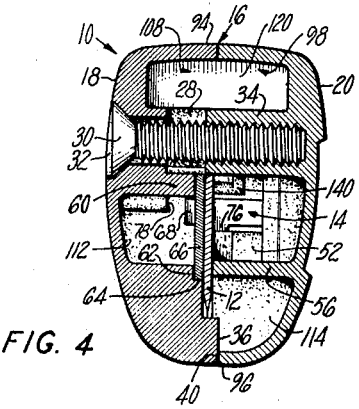
FIG. 4 is an enlarged sectional view of the knife handle of FIG. 1 taken along lines 4—4.
Figure 5:
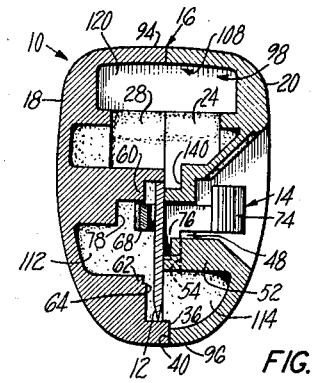
FIG. 5 is another enlarged sectional view of the knife shown in FIG. 1 taken along lines 5—5 of FIG. 1.

Communicating with the cavity defined by blade guide rails 36, 38 is an aperture 48 medially located on the side of element 20 and extending from a position slightly forward of the longitudinal midpoint of handle body 16 rearwardly to adjacent the back face 50 of the handle body 16 but spaced therefrom. Defining the lower longitudinal edge of aperture 48 is an inwardly extending flange 52, as best seen in FIG. 5, possessing a plurality of longitudinally spaced depressions or recesses 54 and 54' constiuting latching stops for the blade carriage 14. The stops permit the positioning of the carriage 14 in any one of the cutting, storing or changing positions indicated in FIG. 1. Positioned forwardly of the aperture 48 on element 20 are a pair of longitudinal flanges 56, 58 protruding inwardly a slightly greater amount than flange 52 so as to provide side supports for the knife blade 12. The side supports 56, 58 maintain the blade in intimate physical contact with the carriage 14 and cooperate through the carriage with the side supports 60, 62 in handle element 18 to maintain the carriage and blade within the central cavity of the handle body. As can be best seen from FIGS. 2 and 4, the above-described flange arrangement provides a central cavity progresing from the aperture 44 in front face 46 rearwardly within handle body 16. This cavity comprises intimately associated dual guide tracks located solely within side element 18, although side element 20 cooperates therewith and forms a side support therefor. The track for carriage 14, as shown, is located farthest from element 20 and is defined by top guide rail 38 and bottom rail 64 disposed between side support 62 and peripheral flange 36 of side element 18. The track for blade 12, as mentioned hereinbefore, is defined by guide rails 36 and 38 and is located between the track for carriage 14 and the handle element 20.

Figure 6:
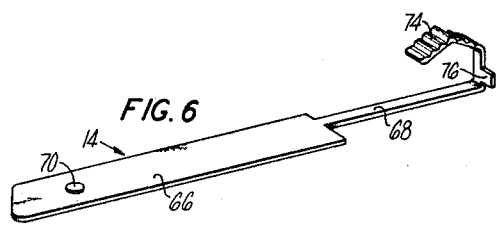
FIG. 6 is a perspective view of the blade carriage of FIG. 1 removed from the assembly.

Blade carriage 14, which slidably moves within its designated track defined by guide rails 38 and 64, as best shown in FIG. 6, is a generally flat, resilient metal member which can be readily stamped from strip steel or the like and comprises a blade mounting portion 66 integrally connected at one end to a narrower carriage rod 68. Blade mount 66 possesses adjacent the free end thereof an integral outwardly extending lug or projection 70 which cooperates with the apertures 72 in blade 12 to maintain the blade and carriage in fixed relative relationship but preferably does not protrude entirely through the aperture 72. On the end of L-shaped carriage rod 68 opposite mount 66 is a serrated or roughened finger-contact portion 74 disposed above and generally parallel to the blade mount 66. Positioned on the outwardly extending leg of L-shaped rod 68, which in assembled relationship with handle body 16 passes through aperture 48 in the side element 20, is detent member 76. Detent 76 cooperates with latching stops 54 to fixedly position blade carriage 14 at the desired location within handle body 16. As best shown in FIGS. 4 and 5, detent 76 is so positioned on the outwardly extending portion of L-shaped carriage rod 68 as to extend, in assembled relationship, outwardly of side support 60 acting against mounting portion 66 thereby subjecting the carrier 14 to a tension force which maintains the detent 76 within the depressions 54 until removed therefrom by applying pressure inwardly against the finger control portion 74. The movement of rod 68 resulting from the inward pressure applied to finger control 74 is limited by the stop 78 on handle element 18 which extends longitudinally a distance equal to approximately the full length of aperture 48, as best shown in FIG. 2. The tension on carriage 14 is, of course, increased when the carriage detent 76 is removed from one of the depressions 54 for purposes of longitudinal movement within handle body 16. However, it is a feature of the present invention that the tension may be substantially removed from the carriage 14 by moving the detent 76 to the forwardmost latching stop depression 54' since this stop is deeper than the remaining depression stops, thus permitting a greater outward movement of detent 76 and its associated carriage rod 68. The release of tension at the forwardmost position effectuated by the enlargement of the forwardmost depression 54' facilitates the ready insertion or removal of the cutting blade 12 from its central track and dislodgement of the aperture 72 in blade 12 from the lug 70 of mounting portion 66.

In the embodiment chosen for illustrative purposes, the cutting blade 12 comprises a plurality of cutting segments 80 each of which contains an aperture 72 and a cutting edge 82 disposed continuously along a longitudinal edge of blade 12. The blade is provided with a front edge 84 disposed at an acute angle to the longitudinal cutting surface 82. As shown, this included angle for the tip 88 of the blade is about 60.° The segments 80 of blade 12 are separated by the periodic scoring lines 86 extending transversely along the sides of the blade 12, the score lines 86 being generally parallel to the front edge 84. These scorings permit ready severance of the blade at the score lines to thereby remove a used portion of the blade and provide a new cutting tip for continuous operation and a minimum loss of blade material.

The front face 46 of handle body 16, according to the present invention, is comprised of converging upper and lower surfaces 90, 92 disposed at approximately a right angle to each other and extending forwardly from top and bottom surfaces 94, 96, respectively, of handle body 16. Additionally, the upper surface 90 is disposed with respect to the axis of reciprocation of carriage 14 at an angle equal to the included angle of the tip 88 of blade 12, thereby facilitating the use of surface 90 when severing dull used segments of the cutting blade.

In operation, the blade is moved by carriage 14 to a scoring position as shown in FIG. 1 and used for cutting operations. As the blade becomes dull the operator can move it to the phantom line position of FIG. 1 and without further changing the position of carriage 14, break off a used segment 80 of blade 12 against the upper surface 90 of front face 46 and continue the cutting operation with the adjacent segment of the blade which, advantageously, is exposed by the angled lower surface 92 of front face 46. Thereby the blade is immediately ready for use without further manipulation.

It is a further feature of the present invention that the handle body 16 possesses a lateral storage compartment generally designated 98 immediately below the top surface 94 of handle body 16 and extending over carriage 14 along a substantial portion of handle body 16. As shown in FIG. 1, extra cutting blades 100 may be retained within the storage compartment 98 and are readily accessible through the opening 102 disposed intermediate top surface 94 and back face 50 in handle body 16. Extending inwardly from opening 102 is transverse aperture 104 communicating with opening 106 located in the bottom surface 96 of handle body 16 and in which is slideably positioned a closure cap 108 for storage compartment 98. Aperture 104 possesses a front wall 110 defined by the rearward bosses 24, 28 and their respective depending transverse flanges 112, 114 inwardly extending from the respective side elements 20, 18. Within the forward wall 110 is an upwardly and forwardly tapering recess 116 possessing a shoulder 118 facing toward the opening 106 in the bottom surface 96 of handle body 16.

The closure cap 108 for storage compartment 98 comprises a head portion 120 having a top surface 122 which fits within opening 102 and interconnects the top surface 94 and the back face 50 of handle body 16. Depending from the flat bottom surface 124 of head portion 120 is a bifurcated V-shaped leg portion 126 comprising a first leg 128 integrally connecting the head portion 120 with a second leg 130 having on the free end thereof a forwardly extending tapered flange 132.

Figure 7:
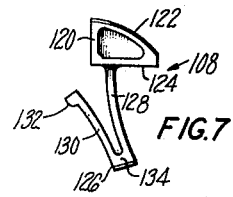
FIG. 7 is a side elevational view of the closure cap for the storage cavity of the handle prior to assembly in the handle body.

The closure cap 108 is preferably made from a plastic material such as nylon or "Delrin," which exhibits high structural strength yet permits good flexibility and resiliency. These latter properties are utilized primarily by the leg portion 126 which is formed in such a manner that the first leg 128, when in a nonstressed condition, arcuately bends rearwardly from the head portion 120 toward the point of juncture 134 with the second leg 130. As shown in FIG. 7, the free leg 130 arcuately bends in the opposite direction thereby imparting to the leg portion 126 its compressible V-shaped configuration. However, in assembled relationship, as best shown in FIG. 1, the leg portion 126 assumes, under compression, a generally U-shaped configuration which facilitates the cooperation between flange 132 and the recess 116 for maintaining the storage compartment closed by hindering downward movement and preventing further upward movement of the closure cap 108 beyond the closed position for the storage compartment 98. As will be appreciated, the user need merely apply a slight downward pressure to the top surface 122 of closure 108 causing tapered flange 132 to slide out of tapered recess 116 effectuating the opening of storage compartment 98. The downward movement of closure 108 is restricted by the coaction of flat bottom surface 124 on closure 108 and upwardly facing shoulder 136 forming a portion of the rear wall 138 of aperture 104. The downward movement of closure cap 108 causes the protrusion of interconnecting portion 134 joining legs 128 and 130 below the bottom surface 96 of handle body 16 thus providing a finger button against which upward pressure may be applied to return the cap 108 to a closed position.

The sequence of assembly operations for the knife of the present invention may be varied substantially, however, it is required that the blade carriage 14 be assembled in the side element 20 prior to joining the side elements 18 and 20 and securing the same by the threaded connector 30. As can be seen from FIGS. 1 and 5, the finger contact portion 74 of blade carriage 14 is generally wider than the aperture 48 whose width is defined by the generally parallel longitudinal flanges 52 and 140 extending inwardly on side elment 20. Consequently, in order to assemble the carriage 14 on the side element 20 the aperture 48 is provided at its forwardmost end with an enlarged opening 142. The opening 142 is effectuated by terminating the upper flange 140 short of the full length of opening 48. Finger control members 74 may then slide through opening 142 permitting the passage of upstanding carriage rod 68 along the extent of aperture 48 with the detent 76 moving adjacent the lower flange 52. After assemblage of the carriage 14 within side element 20, the plastic closure cap may be compressed and inserted into the element 20 by placing the head portion 120 in the opening 102 and the leg flange 132 in recess 116. The complementary side 18 is then aligned and secured to side 20. Alternatively, the closure cap may be inserted into the aperture 104 after assemblage of the complementary side elements. The blade carriage 14, after initial insertion in the aperture 48 through opening 142 is preferably moved so as to position the detent 76 within the forwardmost latching stop 54' thereby permitting a protrusion of about one-half of the mounting portion 66 of carriage 14 beyond the front face 46 of the handle body 16. A cutting blade 12 may then be inserted into its guide track in such a manner that the lug 70 on carriage 14 cooperates with the desired aperture 72 in the blade 12 to fixedly position the blade with respect to the carriage. The finger contact 74 is then depressed and moved rearwardly drawing the carriage and blade into the handle body.

As will be appreciated from the foregoing description the present invention provides an adjustable scoring knife which permits the complete utilization of the handle body both for manipulation of the cutting blade and for storing long extra blades prior to use. Further, the construction provides a front face which cooperates with the blade when breaking off used portions thereof and the immediate reuse of the newly formed cutting tip without further adjustment or positioning of the blade. Additionally, the present invention facilitates the ready mounting of the cutting blade on the slideable blade carriage while the carriage is substantially free from tension. More importantly, however, all of these features are provided without the necessity of disassembling the knife handle.

As will be apparent to persons skilled in the art, various modifications and adaptations of the structure above described will become readily apparent without departure from the spirit and scope of the invention, the scope of which is defined in the appended claims.

We claim:
1. In a knife comprising a storage handle and a removable blade retractable into the handle, a handle body having a transverse opening at one end thereof and a longitudinal storage cavity adjacent the top thereof extending from said opening along a substantial portion of said handle body to adjacent the end thereof opposite said one end; and a resilient partially compressed closure for the cavity movable within said opening between an open and closed position, said closure having means thereon cooperating with said handle body for limiting movement thereof beyond the open and closed positions.

2. In a knife comprising a storage handle and a removable blade retractable into the handle, a handle body having an aperture in the front face thereof and a cavity extending rearwardly therefrom into the interior of said body; blade retaining means slideably disposed within said cavity for locating the blade at a plurality of positions, said handle body having at one end thereof a transverse opening communicating with a longitudinal storage compartment overlying a substantial portion of said handle body adjacent the top thereof; and a storage compartment closure movable within said opening comprising a V-shaped leg portion being inherently resilient and under compression when in assembled relationship, said closure having means thereon cooperating with said handle body for limiting movement thereof beyond the open and closed positions.

3. In a knife comprising a storage handle and a removable blade retractable into the handle, a handle body having a transverse opening at one end thereof and a longitudinal storage cavity adjacent the top thereof extending from said opening along a substantial portion of said handle body to adjacent the end thereof opposite said one end; a resilient partially compressed closure movable within said opening between an open and closed position, said closure having means thereon cooperating with said handle body for limiting movement thereof; and tensioned blade positioning means slidably disposed within said handle and generally underlying said storage cavity, said handle body including means for substantially relieving the tension on said positioning means in assembly thereby facilitating mounting of the blade.

4. In a knife comprising a storage handle and a replaceable blade retractable into the handle, a handle body having a central aperture in the front face thereof and a longitudinal cavity extending rearwardly therefrom into the interior of said body; a resilient blade carrier slidably disposed within said cavity and adapted to receive a knife blade without disassembly of the handle, said handle body having at the end thereof opposite said front face a transverse opening communicating with a longitudinal storage compartment overlying at least a portion of said cavity and extending along a substantial portion of said handle body adjacent the top thereof; and a storage compartment closure movable within said opening normal to the axis of reciprocation of the retractable blade within said cavity to thereby open and close said storage compartment, said closure comprising a head portion and a V-shaped leg portion, said leg portion comprising a first leg depending from said head portion and integrally connected to a second leg, said leg portion being inherently resilient and under compression when in assembled relationship, said handle body having closure-retaining means within said opening cooperating with means in said leg and top portions preventing removal of said closure from said opening.

5. In a knife comprising a storage handle and a reciprocal blade retractable into the handle, a handle body having a transverse opening at one end thereof and a longitudinal storage cavity adjacent the top thereof extending from said opening along a substantial portion of said handle body to adjacent the end thereof opposite said one end, the front and rear surfaces of said opening defining oppositely facing shoulders disposed therein; and a storage cavity closure movable vertically within said opening to thereby open and close said storage compartment, said closure comprising a head portion having a flat bottom surface and a V-shaped leg portion, said leg portion comprising a first leg depending from the bottom surface of said head portion and being integrally connected to a second leg, an outwardly extending flange on the free end of said second leg, said leg portion being inherently resilient and under compression when in assembled relationship whereby said outwardly extending flange cooperates with the shoulder positioned on the front surface of said opening to prevent movement of said closure upwardly beyond the closed position and the flat bottom surface of said head portion cooperates with the rear shoulder of said opening to limit the movement of said closure downwardly beyond the open position.

6. In a knife comprising a storage handle and a reciprocal blade retractable into the handle, a generally rectangular handle body having a front face comprising converging upper and lower surfaces extending forwardly of the top and bottom of said handle body, the upper surface of said face constituting a major portion thereof and being disposed with respect to the axis of reciprocation of the blade at an angle substantially equal to the included angle of the tip of the blade and at substantially a right angle to said lower surface, said handle body having a central aperture in said front face and a longitudinal cavity extending rearwardly therefrom into the interior of said handle body, the side face of said body having a longitudinally extending aperture medially disposed therein communicating with said cavity; and a flat resilient blade carriage reciprocably slideable within said cavity and having a portion thereof projecting outwardly through the side aperture in said body to facilitate external manipulation thereof, said projecting portion having means thereon cooperating with said handle body for placing said carriage under tension when assembled, said handle body having additional means for substantially relieving the tension on said carriage when assembled thereby facilitating the mounting of the blade on said carriage.

7. In a knife comprising a storage handle and a removable blade retractable into the handle, a generally rectangular handle body having a central aperture in the front face thereof and internal longitudinal guide rails extending rearwardly therefrom providing a cavity for a blade carriage and terminating adjacent the end of said body opposite said front face, said handle body having a longitudinally extending aperture medially disposed along the side face thereof and a plurality of latching stops longitudinally spaced on the inner surface of said body below said side aperture; and a resilient blade carriage comprising a flat blade mount longitudinally slideable in said guide rails and an integral carriage rod projecting outwardly through the side aperture in said handle body and terminating in a finger contact means, said carriage rod having detent means on the outwardly projecting portion thereof cooperating with said latching stops to position the mount and maintain said carriage under tension, said mount having adjacent the free end thereof means for retaining the knife blade between the mount and the side of said body having said aperture, said forwardmost latching stop being deeper than the other latching stops to substantially relieve the tension on said carriage when said detent is positioned therein thereby facilitating the mounting of the knife blade.

8. In a knife comprising a storage handle and a replaceable blade retractable into the handle, a generally rectangular handle body having a front face comprising converging upper and lower surfaces extending forwardly of the top and bottom of said handle body, the upper surface of said face constituting a major portion thereof and being disposed with respect to the axis of reciprocation of the blade at an angle substantially equal to the included angle of the tip of the blade and at substantially a right angle to said lower surface, said handle body having a central aperture in said front face and internal longitudinal guide rails extending rearwardly therefrom providing a cavity for a blade carriage terminating adjacent the rear face of said body, said handle body having at the end thereof containing said rear face a transverse opening communicating with a longitudinal storage compartment overlying a portion of said cavity and extending along a substantial portion of said handle body adjacent the top thereof, the front and rear surfaces of said opening defining oppositely facing shoulders disposed therein; a storage compartment closure movable within said opening normal to said cavity and said compartment to thereby open and close said storage compartment, said closure comprising a head portion and a V-shaped leg portion, said leg portion comprising a first leg depending from the bottom surface of said head portion and integrally connected to a second leg, said leg portion being inherently resilient and under compression when in assembled relationship, said closure having means cooperating with the shoulders within said opening to prevent movement of said closure beyond the open and closed positions, said handle body having a longitudinally extending aperture medially disposed along the side face thereof and a plurality of latching stops in the form of depressions longitudinally spaced on the inner surface of said element below said aperture, the forwardmost depression being slightly deeper than the remainder; and a resilient blade carriage comprising a flat blade mount longitudinally slideable in said guide rails and an integral carriage rod projecting outwardly through the side aperture in said handle body and terminating in a finger contact means, said carriage rod having detent means on the outwardly projecting portion thereof cooperating with said latching stops to position the mount and maintain the carriage under tension, said mount having adjacent the free end thereof a lug integrally offset therefrom for retaining the knife blade between the mount and the side of said body having said aperture, the tension on said carriage being substantially relieved when said detent is positioned in the forwardmost latching stop thereby facilitating the mounting of the knife blade.

References Cited by the Examiner
UNITED STATES PATENTS

| | | | |
|---|---|---|---|
| 298,649 | 5/1884 | Yingling. | |
| 2,047,081 | 7/1936 | Roch et al. | |
| 2,489,707 | 11/1949 | Eubanks | 16—110.5 X |
| 2,548,797 | 4/1951 | Ingwer et al. | 30—162 |
| 2,651,839 | 9/1953 | Folland | 30—215 |
| 2,776,484 | 1/1957 | Resner | 30—125 X |
| 3,041,724 | 7/1962 | Bobkowski | 30—162 |
| 3,063,147 | 11/1962 | Paperelli | 30—320 |
| 3,107,426 | 10/1963 | Robinson | 30—162 |

JAMES L. JONES, JR., *Primary Examiner.*

WILLIAM FELDMAN, *Examiner.*